Aug. 18, 1936.  J. A. GUYER  2,051,335
HYDROCARBON TREATING PROCESS
Filed Jan. 19, 1932  2 Sheets-Sheet 2
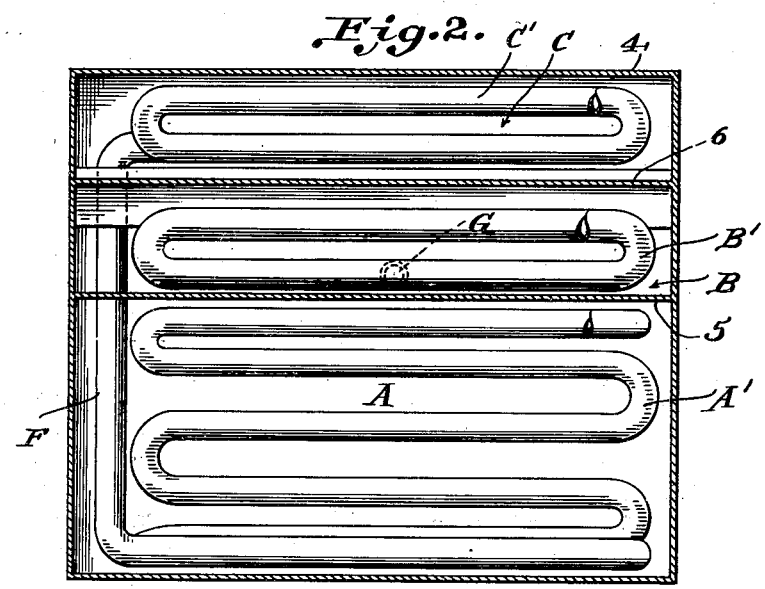
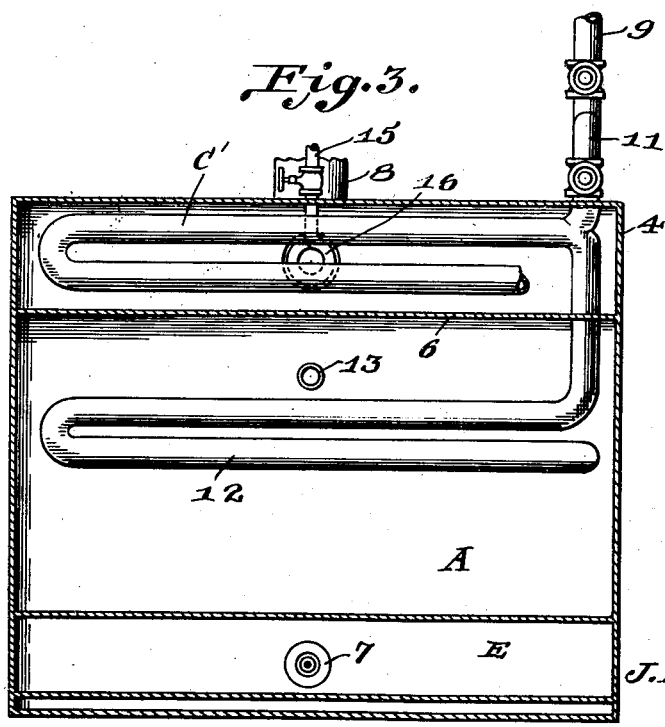
Inventor
J. A. Guyer
By Robt. E. Barry
Attorney Patented Aug. 18, 1936

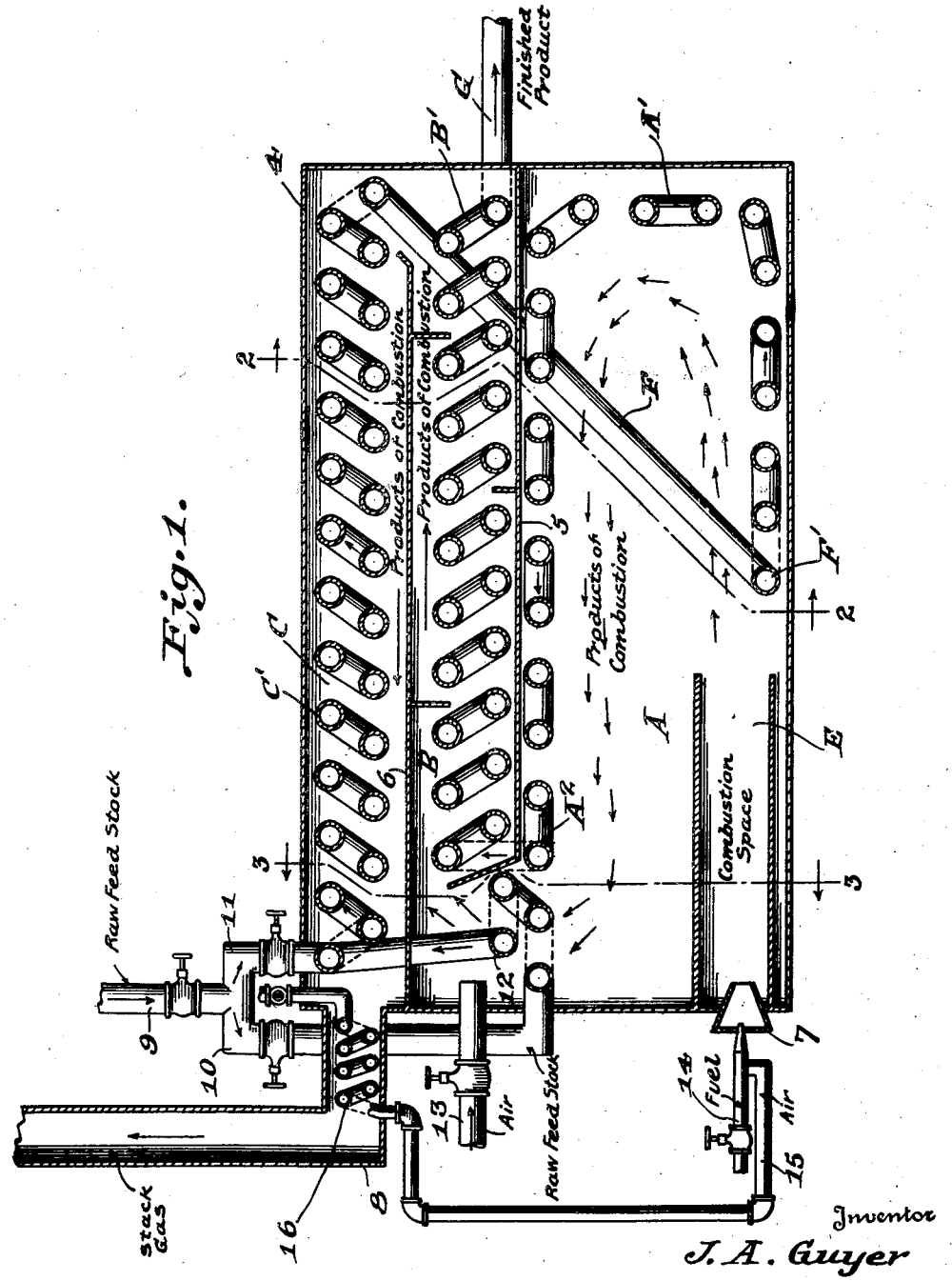

2,051,335

UNITED STATES PATENT OFFICE 2,051,335

HYDROCARBON TREATING PROCESS

Jesse A. Guyer, Bartlesville, Okla., assignor to Phillips Petroleum Company, Bartlesville, Okla., a corporation of Delaware Application January 19, 1932, Serial No. 587,583

2 Claims. (Cl. 196—51)

This invention relates to improvements in methods of operating furnaces for heating or treating hydrocarbon oils and the like.

One of the objects of the invention is to operate a furnace having a sectional coil, so that, in one section of the furnace the temperature of the oil undergoing treatment can be held at any desired degree to provide time for chemical reactions.

Developments in cracking, polymerization and hydrogenation of hydrocarbons has made it desirable to develop equipment by which the time-temperature relationship can be accurately controlled and regulated independently. The well known reaction chamber method is limited, due to the fact that the temperature within the chamber cannot be controlled without changing the rate of through put or the temperature of the hydrocarbons entering the chamber. Localized super-heating or cooling cannot be avoided, and carbon formation cannot be controlled. Furthermore, reaction chambers in general are large, expensive and cannot be precisely controlled.

Tube furnaces employed at present are not adapted for use with processes recently developed for the thermal decomposition of hydrocarbons and high temperature polymerization of hydrocarbon gases. In most cases, such processes require the hydrocarbons to be heated to a much higher temperature (1200°–1800° F.) than is ordinarily used for oil cracking. Recent developments, particularly in the cracking of gases, have shown that the hydrocarbons must be heated to maximum reaction temperatures as rapidly as possible and then be held at approximately that temperature for a sufficient time to allow the desired reaction to go to the extent where the maximum yield of the desired product is produced. The above statements of time and temperature are indefinite, since they depend upon the process practiced and the product desired. Frequently, the reactions taking place after the product has been heated to its maximum temperature and is being held at high temperature to allow the reaction to proceed, are exothermic and cause the temperature of the reacting material to increase. This may or may not be desirable. In many cases, very little heat input to the reacting material is required, and frequently, the extensive exothermic reactions may require a small heat removal in order to prevent the temperature increase to the point where undesirable reactions take place.

In order to obtain these conditions and operate efficiently, I have discovered that a furnace must have, (1) a section where the incoming hydrocarbons travel counter-current to the products of combustion leaving the furnace. In this section the hydrocarbons are preheated. (2) A section where the above preheated hydrocarbons are rapidly brought up to the desired reacting temperature. This section should, in the main combustion zone, be substantially surrounded by a main heating coil. Previous practices have shown that this coil should receive its maximum heat from the radiant heat of the flame of the combustion chamber. (3) A section where the hot reacting materials from the coil in section (2) is held for sufficient time to allow the desired reaction to proceed. In this section (3), the material in the coil may be heated slightly or cooled to control the reaction.

It is evident that the high temperature necessary in section (2) requires complete combustion with very little excess air used for combustion. Of course, preheated air or mixing hot products of combustion with the burning mixture may be used if desired. This method is in common use and should not be confused with the practice of mixing partly cooled products of combustion or air with the products of combustion in the combustion zone to moderate the temperature of the products of combustion before they come in contact with any coil section. The exact temperature conditions required in section (3) cannot be obtained by control of the combustion in section (2) without changing the most efficient operating conditions in section (2).

In all prior proposals of which I have a knowledge, the temperatures in all sections of the heating and reacting coil are controlled by regulating the temperature of the combustion zone, or by arranging the coil sections in various ways. These prior arrangements are distinctly different from mine in two particulars. First, the maximum temperature is not obtained in the combustion chamber; second, the conditions surrounding or in any one section of the coil arrangement cannot be changed or controlled during operation without affecting conditions in other sections of the coil arrangement.

My proposed equipment is a cracking, polymerizing, hydrogenating or skimming and cracking tube furnace designed to permit accurate control of the temperature conditions in any one section of the tube coil, independent of the temperature in any other section of the tube coil, without changing the rate of through-put in the heating coil. The design of the improved furnace is based upon a thorough knowledge of the proper relationship between temperature and reaction time necessary to successfully carry out recently developed processes in which it is necessary to separately control endothermic and exothermic reactions.

With the foregoing object outlined and with other objects in view which will appear as the description proceeds, the invention consists in the novel features hereinafter described in detail, illustrated in the accompanying drawings, and more particularly pointed out in the appended claims.

In the drawings,

Fig. 1 is a vertical longitudinal sectional view of the improved furnace.

Figs. 2 and 3 are transverse sectional views taken respectively on the lines 2—2 and 3—3 of Fig. 1.

Referring to the drawings, 4 indicates a closed casing which may be insulated in any suitable manner against the loss of heat, and which is provided internally with superposed baffles 5 and 6. These baffles form a zig-zag passageway through the furnace, starting at the burner 7 and ending at the stack 8. In the embodiment illustrated, such passageway comprises a main heating zone A, an intermediate zone B, and a preheating zone C.

A heating coil is arranged in these zones and comprises a preheating section C', an intermediate section B', and a main heating section A'.

Oil to be treated enters the coil through the valved pipe 9 which has valved branches 10 and 11. Some or all of the oil can pass from branch 10 to the section C' of the coil by way of a tube 12 having a portion positioned within the furnace at the point where the products of combustion from the burner enter the intermediate section B. Furthermore some or all of the oil can pass from the pipe 9 through the branch 11 into the coil section C' without travelling through the tube 12. In either event, the oil enters the coil section C' and travels in a direction counter-current to the products of combustion flowing to the stack.

From the outlet end of the coil section C', the oil then flows downwardly through a connecting section F and enters the main coil section at F'. This main section is arranged partially along the bottom of the zone A, then up one end of the same, and thence along the top of said zone until it merges at A² into the inlet end of the section B'.

The oil discharged at A² enters the section B', it travels through that section and is finally discharged at G, and the pipe G can lead it to any suitable after treatment apparatus.

For the purpose of introducing air, for temperature control, into the inlet end of the intermediate zone B, a valved air pipe 13 enters the casing or housing at the place where the products of combustion pass from zone A to zone B.

The fuel for the burner 7 enters through a valved pipe 14, and the air for such burner is introduced through a valved pipe 15. If it is desired to preheat the air, this can be accomplished by arranging a portion of the pipe 15, in the form of a coil 16, in the stack.

The primary combustion of fuel in this apparatus takes place in a restricted combustion space E to insure rapid and complete mixing of the fuel and air. The products of combustion in highly heated condition discharge into the main heating zone A where heat is given up to the coil section A'. Most of the heat through the tube walls in this section is due to radiant heat from the hot products of combustion. The hot products of combustion pass from zone A into zone B where they reverse their direction of flow, and then pass through zone C and finally to the stack.

The feed stock preferably enters the coil section C' by a divided stream. A portion enters through the tube 12 where it is heated by the hot products of combustion entering zone B. The remainder of the feed stock enters the coil section C' through the valved branch 11. The purpose of this divided inlet stream is to use a portion, or all if necessary, of the feed stock to cool the products of combustion entering the zone B, thereby decreasing the amount of air or other diluent added through valve 13. For efficient heat conservation, the major cooling of the products of combustion should be done by increasing the amount of hydrocarbon through the tube 12, and using air or another diluent through 13 as a final adjustment only.

The feed stock passes through the coil section C' counter-current to the flow of products of combustion, and it then passes through the long connecting tube F into the radiant heat coil section A'. As before stated, it will then be discharged through section B'.

Referring more specifically to the operation of the apparatus, it will be noted that the coil section C' is a preheat section, where heat from the products of combustion is transferred by conduction to the cold oil or other hydrocarbon fluid entering the system. Preheated hydrocarbon fluid from this section enters section A', conveniently referred to as the radiant heat section, due to the fact that the majority of the heat transferred to the hydrocarbons in the coil section A' is by radiation. The final reaction temperature is reached in the last portion of this radiant heat section, and this temperature is maintained through the tubes in the intermediate coil section B' by controlling the temperature of the products of combustion as they pass from the radiant heat section to said intermediate section. This may be accomplished by either adding heat to the products of combustion or by cooling said products as they enter the zone or passageway B. Due to this controlled reaction temperature in coil section B', this section may be referred to as a "controlled reaction" zone. Such control may be accomplished by cold stock passing through the tube 12', or by the volume of air or diluent introduced through the pipe 13, or by both. Obviously, other methods of controlling the temperature of the products of combustion entering the zone B can be made use of if desired.

If the chemical reaction taking place in the coil section B is strongly exothermic, the temperature of the products of combustion in the zone B should be low enough to allow a slight cooling of the oil in section B'. On the other hand, if the reaction is endothermic, the temperature of the products of combustion in B should be high enough to allow a slight heating of the oil in the section B'. In any case, the temperature of the products of combustion should be adjusted to make up the heat lost in the tube coil B', due to passing through headers and connections. Unless the reaction is strongly exothermic, it is likely that there will always be a higher input in section B' in order to maintain a constant temperature in that section. Of course, the size and number of tubes in section B' can be adjusted according to the desired reaction time.

The apparatus may be employed to treat any suitable hydrocarbon fluid, such as oil, vapor or gas, and instead of air introduced through valve 13, I may use steam or any other suitable diluent in fluid condition.

From the foregoing it is believed that the construction of the apparatus, steps of the method and advantages of the invention will be readily understood by those skilled in the art, and I am aware that changes may be made in the details disclosed, without departing from the spirit of the invention, as expressed in the claims.

What I claim and desire to secure by Letters Patent is:

1. A method of the character described, comprising passing hot products of combustion first through a zone heated largely by radiant heat, then through a digestion heating zone, and finally through a preheating zone, simultaneously passing a hydrocarbon fluid through a sectional heating coil extending through said zones, the hydrocarbon fluid being passed first through the coil section in the preheating zone for preheating said fluid, then through the radiant heat zone where said fluid is subjected to the maximum heat of said hot products of combustion, and finally through the digestion zone, and positively controlling the temperature of said fluid in the digestion zone by subjecting the hot products of combustion as they enter the digestion zone to independently regulated indirect heat exchange with a flowing stream of hydrocarbon fluid, and also by introducing a stream of a gaseous diluent into the travelling hot products of combustion as they enter the digestion zone.

2. A method of the character described, comprising passing hot products of combustion first through a zone heated largely by radiant heat, and then through a digestion heating zone, simultaneously passing a hydrocarbon fluid through a sectional heating coil extending through said zones, the hydrocarbon fluid being passed first through the radiant heat zone where said fluid is subjected to the maximum heat of said hot products of combustion, and finally through the digestion zone, and positively controlling the temperature of said fluid in the digestion zone by subjecting the hot products of combustion as they enter the digestion zone to independently regulated indirect heat exchange with a flowing stream of hydrocarbon, and also by introducing a stream of gaseous diluent into the travelling hot products of combustion as they enter the digestion zone.

JESSE A. GUYER.